United States Patent [19]

Vitaliev et al.

[11] 3,913,075

[45] Oct. 14, 1975

[54] ASSOCIATIVE MEMORY

[76] Inventors: Georgy Viktorovich Vitaliev, ulitsa Vavilova 39, kv. 17, Moscow; Alexei Davidovich Gvinepadze, Ljubertsy, ulitsa Molodezhnaya 10, kv. 17, Moskovskaya oblast; Anastasia Adrianovna Koltsova, ulitsa Profsojuznaya 36/9, kv. 26; Rem Vasilievich Smirnov, Teply stan, mikroraion 3, korpus 32, kv. 36, both of Moscow, all of U.S.S.R.

[22] Filed: Nov. 19, 1973

[21] Appl. No.: 416,941

[52] U.S. Cl. .......................................... 340/173 AM

[51] Int. Cl. ......................... G11c 15/00; G11c 7/00

[58] Field of Search...340/172.5, 146.1 AL, 173 AM, 340/173 LC

[56] References Cited

UNITED STATES PATENTS

| | | | |
|---|---|---|---|
| 3,069,657 | 12/1962 | Green et al. | 340/146.1 AL |
| 3,144,634 | 8/1964 | Wright | 340/146.1 AL |
| 3,601,798 | 8/1971 | Hsiao | 340/146.1 AL |
| 3,626,374 | 12/1971 | Chinlund | 340/172.5 |

*Primary Examiner*—Gareth D. Shaw
*Assistant Examiner*—Michael C. Sachs
*Attorney, Agent, or Firm*—Waters, Schwartz & Nissen

[57] ABSTRACT

An associative memory comprises address memory modules, detectors, and interrogation register and interrogation converters, the flip-flops of the interrogation register being divided into groups, and the inputs of each interrogation converter being coupled electrically to the outputs of a respective group of the flip-flops in the interrogation register, while the outputs of each interrogation converter are coupled electrically to the address buses of respective address memory modules. The interrogation converters may be designed as interrogation decoders while the detectors are designed as coincidence circuits the number of inputs whereof is equal to that of the interrogation register flip-flop groups. The invention makes it possible to carry out parallel associative search operations with the use of simple address-accessible memory modules arranged in a high-capacity and high-speed memory. It also allows to perform logical operations and complex search operations as well as a number of arithmetic and nonarithmetic operations.

19 Claims, 7 Drawing Figures

ASSOCIATIVE MEMORY

The invention relates to devices intended to perform search and logical operations on data presented in digital (binary) form and, in particular, to associative memories.

The invention can find application in retrieval computers and high-speed systems.

Known in the art is an associative memory provided with address memory modules that serve to store binary data, which comprises memory elements with address and digit buses used to record and select the data that is stored in these modules; detectors used to detect the location of data with a given set of binary attributes, the detector inputs being coupled electrically to respective digit buses of the address memory modules; and an interrogation register intended to store the given set of binary indications, i.e., the interrogation code, and provided with one or more flip-flops equal in number to the binary indications in the interrogation code, the outputs of the interrogation register flip-flops being coupled electrically to the address buses of respective address memory modules. The associative search procedure in this memory device is based on the principle of equivalence of non(equivalence between the interrogation code and the codes of the associative words stored in this device in the form of paraphase codes, i.e., such codes in which two memory elements are used to store one bit of data. The nonequivalence principle here and in what follows is meant to denote the registration of the coincidence between the interrogation code and the code of the given associative word, provided that the direct interrogation code and the reverse code of the associative word, on the one hand, and the reverse interrogation code and the direct code of the associative work, on the other, are identical. The equivalence principle implies that the coincidence between the direct interrogation code and the direct code of the associative word, as well as between the reverse interrogation code and the reverse code of the associative word is to be registered.

A disadvantage of the known device resides in that to perform a search operation based on the principle of equivalence or non-equivalence, its detector should be highly immune to interference since all address buses (or interrogation buses) can become excited in the course of interrogating N digit codes. In this case, all memory elements located on the excited address buses will be in the "0"-state if the interrogation code coincides with the code of a given associative word. Therefore, the N "0"-signals or N coincidence signals, when summed up on the respective digit bus, may be treated by the detector as a "1" signal or as a non-coincidence signal. Thus, the misoperation of the detector will prevent the system from registering the coincidence between the interrogation code and the code of the given associative word.

This disadvantage substantially limits the capacity and speed of the known associative memory and renders it impracticable.

Other known associative memory devices using special associative modules which are characterized in that the non-equivalence principle is realized inside memory modules.

A disadvantage of these devices resides in that their special modules are rather complicated in design and are difficult to control, which makes their manufacture difficult and costly.

It is an object of the present invention to provide an associative memory that will make it possible to perform associative search operations by using simple and cheap address memory modules with nondestructive reading.

This object is attained by that the associative memory, which is designed to perform search and logical operations attributive information, i.e., on data presented in the form of multidigit binary associative words or, to put it in a different way in the form of sets consisting of a plurality of binary associative indications, comprises: address memory modules serving to store binary data and having memory elements interconnected through address and digit buses which are intended to record and select the data stored in these data memory modules; detectors for detecting the location data with the required set of binary associative indications the detector inputs being coupled electrically to respective digit buses of the address memory modules; and an interrogation register intended to store a given set of binary associative indications representing the interrogation code and provided with flip-flops equal in number to the binary associative indications in the interrogation code, the outputs of the interrogation register flip-flops being coupled electrically to the address buses of respective address memory modules, and which, according to the invention, is also provided with interrogation converters intended to convert the interrogation code from a binary position code into a code with a constant number of "1"s, the interrogation register flip-flops being divided into groups, while the inputs of each interrogation converter are coupled electrically to the outputs of a respective group of the interrogation register flip-flops and the outputs of each interrogation converter are coupled electrically to the address buses of respective address memory modules.

It is expedient that the interrogation converters be designed as interrogation decoders converting the binary position code into a single excited-state code, and the detectors be designed as coincidence circuits the number of inputs whereof is equal to that of groups of the interrogation registers flip-flops.

It is also expedient that the interrogation converters comprise long-term memory modules intended to convert the interrogation code from a binary position code into a code having a constant number of "1"s and provided with address and digit buses to select the codes stored in these modules, the address buses of each long-term memory module being connected to the outputs of a respective interrogation decoder and the digit buses of each long-term memory module being connected to the address buses of respective address memory modules.

It is preferable that the interrogation converter be provided with modulo 2 adders with each group of the interrogation register flip-flops being divided into a number of sets, the first set including subgroups with a single flip-flop and the other sets, subgroups with two or more flip-flops, while the interrogation decoders and the modulo 2 adders are divided into sets consisting of respective subgroups, the outputs of the interrogation decoders of each subgroup being connected to the first inputs of the modulo 2 adders of the same subgroup, the output of each modulo 2 adder being coupled to the second inputs of the modulo 2 adders in one of the subgroups of the next set, and the outputs of the modulo 2 adders in the last set being connected to the address buses of respective address memory modules.

It is advisable that the memory should have a mask register intended to store the mask binary code wherein the positions of "1"s and "0"s show the associative indications of the interrogation code irrelevant to the search operation to be performed, and provided with one or more flip-flops equal in number to the binary associative indications in the interrogation code, as well as with OR circuits in which the first inputs are connected either to "1" or "0" outputs of respective mask register flip-flops, the second inputs are connected to the outputs of respective interrogation register flip-flops and the outputs are connected to the inputs of respective interrogation converters.

It is convenient that the memory should have multi-input OR circuits and an output register which is intended to receive data read from respective address memory modules and which comprises one or more flip-flops equal in number to the binary associative indications in the interrogation code, the output register being divided into groups of one or more flip-flops; each group of the output register flip-flops has its input connected to the output of a respective multi-input OR circuits, the inputs whereof are connected to respective digit buses of the address memory modules, while the flip-flops in the interrogation register and in the mask register are also divided into groups wherein the number of flip-flops is equal to that of flip-flops in the output register groups.

It is also convenient that the memory should have an input register which stores a multidigit binary code with the possibility to subject said code as well as the code of any of the associative words stored in the address memory modules to any given logical operation; said input register comprises one or more flip-flops equal in number to the binary associative indications in the interrogation code, and is divided into groups of one or more flip-flops; the memory should also have coincidence circuits with their first inputs being connected to "1" or "0" outputs of the flip-flops in a respective input register group, and an operation decoder designed to transfer data to the interrogation register and to the output register since the relevant data is transferred from the outputs of the input register flip-flops either in the direct or reverse code depending on the logical operation that is being performed and the code stored in the input register, respective outputs of the operation decoder being connected to the second inputs of the coincidence circuits, while the outputs of one part of the coincidence circuits are connected to the inputs of respective groups of the interrogation register flip-flops and the outputs of the other part of the coincidence circuits are connected to the inputs of respective multi-input OR circuits.

It is advisable that the flip-flop groups of the input and output registers should make up shift registers, while the flip-flop groups of the mask register should make up ring shift registers.

The memory can also be provided with additional decoders, each performing the function of several detectors; a priority circuit intended to select detectors in a preset sequence and in accordance with the given set of binary associative indications in the course of a multidigit selection procedure, i.e., when several associative words are selected simultaneously, the inputs of the priority circuit being connected to the first outputs of all the additional decoders; and "0" and "1" signal coincidence circuits, the address memory modules making up $m$-module sets to store $m$-digit binary associative indications, which makes it possible to write up to $2^m - 1$ different associative indications in a set of $m$-modules having $m$-digit buses, hence, up to $2^m - 1$ different associative words, similar digit buses of the address memory modules in each set being connected to the inputs of the "0" and "1" signal coincidence circuits that correspond to a particular set, while the outputs of the coincidence circuits of each set are connected to the inputs of respective additional decoders.

The object of the invention is also attained by providing a memory with a data storage unit comprising memory elements that are interconnected by means of address buses and read-write digit buses and are arranged in K-digit cells, which is designed to store data every word of which corresponds to a particular set of binary associative indications stored in the address memory modules that make up the memory unit for storing data indications; besides, the memory is provided with a data register comprising flip-flops equal in number to digits in a cell of the data storage unit, the read digit buses of the data storage unit being connected to the inputs of respective data register flip-flops, the write digit buses being connected to the outputs of respective data register flip-flops and the address buses of the unit being coupled electrically to the outputs of respective detectors.

Each cell of the data storage unit should preferably contain additional memory elements that could be used to record the code of an associative word placed in accordance with a given cell of the data storage unit, while the data register should be provided with one or more additional flip-flops either to store codes arriving from the interrogation register to be recorded in the data storage unit or to receive codes from the data storage unit; the number of these additional memory elements in each cell of the data storage unit and the number of additional data register flip-flops should be equal to that of the interrogation register flip-flops, while the second inputs of the additional data register flip-flops should be connected to the outputs of similar interrogation register flip-flops, and the inputs of the interrogation register flip-flops should be connected to the outputs of similar additional data register flip-flops.

It is expedient that the memory comprise a digit-by-digit comparison circuit having the first group of its inputs connected to the outputs of respective flip-flops in the interrogation register, while the second group of its inputs is connected to the outputs of respective additional flip-flops of the data register.

It is also expedient that the memory be provided with a code converter intended to determine whether the number of the excited detector corresponds to that of one or more (in case the access procedure is based on the address signal coincidence) address buses in the data storage unit, the inputs of the code converter being connected to the outputs of all the detectors and the outputs of the converter being connected to respective address buses of the data storage unit.

The associative memory embodying the present invention makes it possible to perform parallel associative search operations with the use of simple address-accessible memory modules and is characterized by high capacity and high response. Besides, it allows to easily perform logical operations, complex search operations and a number of arithmetic and non-arithmetic operations that can be represented in the form of a sequence of a finite number of logical and search operations. In practice, the equipment efficiency can reach the level at which one associative indication, i.e., one digit of an associative word, would require from one to two memory elements.

The invention will be better understood from the following description of a prepared embodiment thereof given by way of example and with reference to the accompanying drawings, in which.

Figures 2, 3:
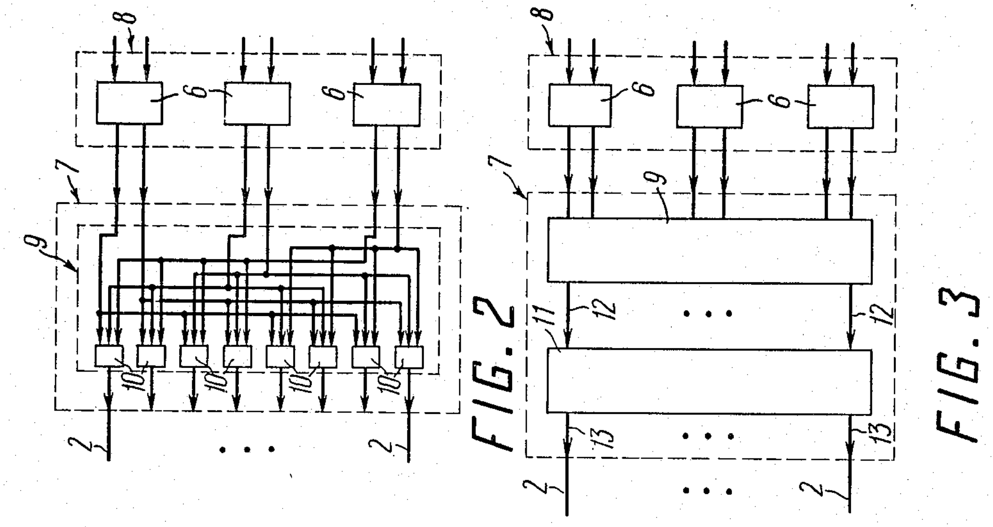
FIG. 2 is a block diagram illustrating an interrogation converters, according to the invention.
FIG. 3 is a block diagram of another embodiment of the interrogation converter, according to the invention.

The associative memory comprises address memory modules 1 (FIG. 1) containing memory elements $1^1$ interconnected through address buses 2 and digit buses 3, the digit buses 3 being connected to the inputs of detectors 4, whereof each is connected electrically to one or more buses 3, while the memory elements $1^1$ of the modules 1 coupled to these buses 3 are used to store the code of an associate word that corresponds to this detector 4. Besides, the memory has an interrogation register 5 provided with one or more flip-flops 6 whose outputs are coupled electrically to respective buses 2 of the modules 1.

According to the invention, the memory also comprises interrogation converters 7, and the flip-flops 6 in the registers 5 are divided into groups 8 containing one or more flip-flops 6. The inputs of each converter 7 are coupled electrically to the outputs of the flip-flops 6 in a respective group 8, while the outputs of the converters 7 are connected electrically to the address buses 2 of respective modules 1. The number of the groups 8 depends on the ratio between the number of the flip-flops 6 in the interrogation register 5 and the number of the address buses 2 of the memory modules 1.

Figure 1:
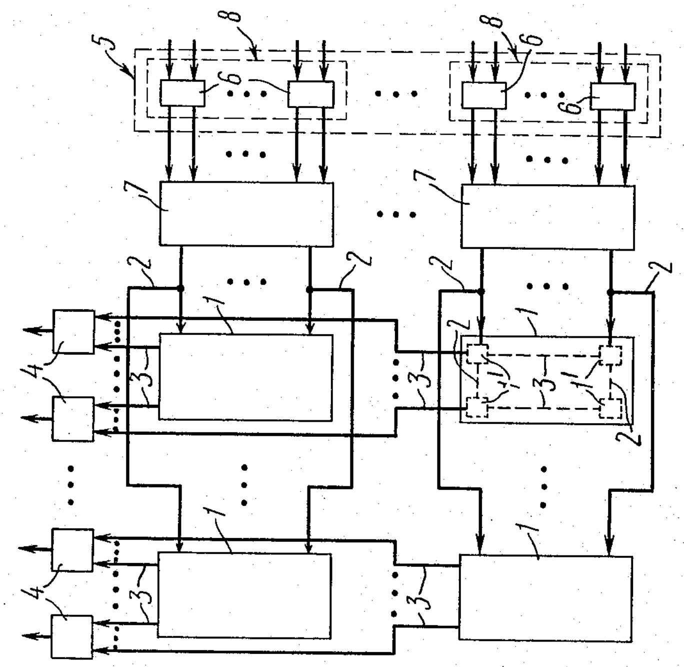
FIG. 1 is a general block diagram of an associative memory, according to the invention.

Consider an embodiment of the interrogation converter 7 desined as an interrogation decoder 9 (FIG. 2), i.e., a device converting a standard binary code into a code with a single excited state, out of N possible states (in the case under consideration, N = 8). In this case, the interrogation converter 7 is made as the interrogation decoder 9 comprising eight three-input coincidence circuits 10, each input being connected either to the direct ("1") or to the inverse ("0") output of one of three flip-flops 6 in a respective group 8 of the register 5 (FIG. 1).

Consider now another embodiment of the interrogation converter 7 intended to convert an ordinary binary code into a code with a constant number of "1"s. In this case, the converter 7 (FIG. 3) also comprises a long-term memory module 11 with address buses 12 and digit buses 13, the outputs of the interrogation decoder 9 being connected to similar buses 12 in the module 11 and the buses 13 being connected to respective buses 2 of the modules 1 (FIG. 1).

The structure of the element 1 is exemplified, for instance, in U.S. Pat. No. 3,611,318, (FIGS. 1 and 2), and the structure of element 11 is described, for example, in U.S. Pat. No. 3,529,299 (FIGS. 1 and 2), and U.S. Pat. No. 3,641,516 (FIG. 1). These references are of informative character and are not directly related to the subject matter of the present invention.

Figure 4:
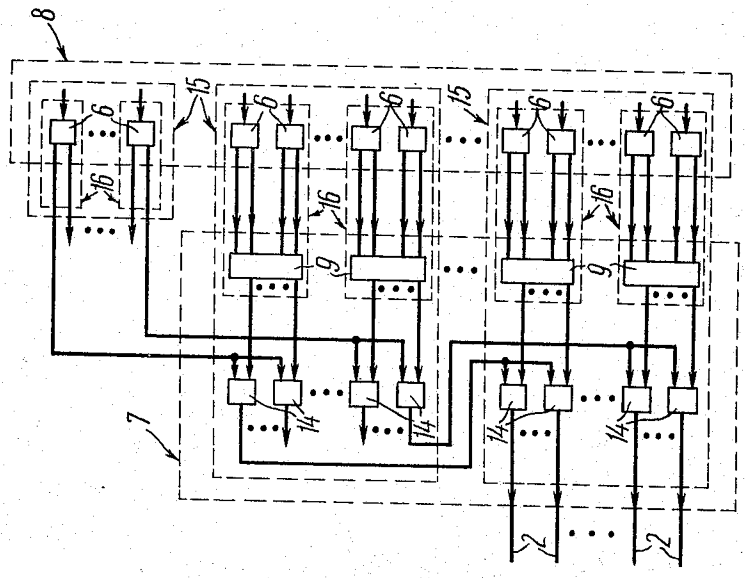
FIG. 4 is a block diagram of still another embodiment of the interrogation converter, according to the invention.

Consider yet another embodiment of the interrogation converter 7 (FIG. 4) which converts a binary position code into a code with a constant number of "1"s. This converter 7 comprises modulo 2 adders 14. In this case, each group 8 of flip-flops 6 in the register 5 (FIG. 1) and, consequently, the interrogation decoder 9 are divided into sets 15 (FIG. 4). The first set contains subgroups 16 with a single flip-flop, while the subgroups 16 in subsequent sets 15 have two or more flip-flops, as well as respective decoders 9, each. The outputs of the decoders 9 in each subgroup 16 are connected to the first inputs of the adders 14 belonging to this subgroup, the output of each adder 14 is coupled to the second inputs of the adders 14 in one of the subgroups of a subsequent set 15, and the outputs of the adders 14 in the final set are connected to the buses 2 in respective modules 1 (FIG. 1).

Figure 5:
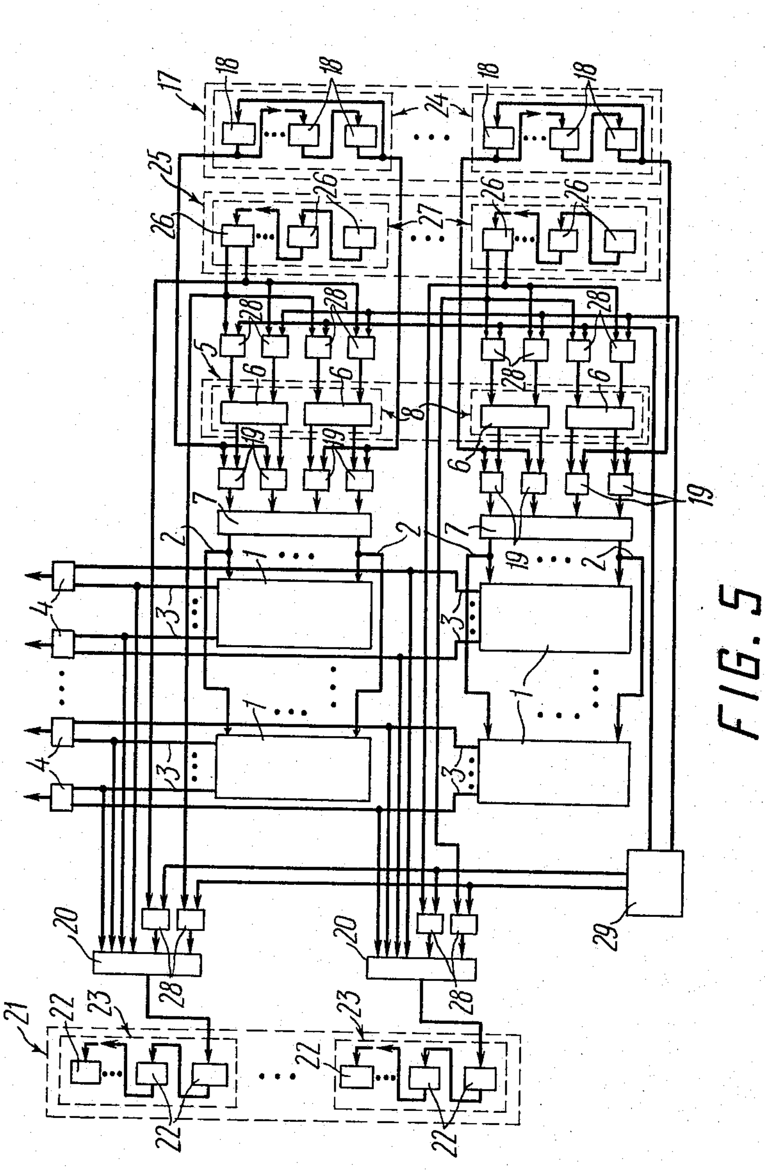
FIG. 5 is a functional diagram of a memory which makes it possible to perform masking functions, a complepe set of logical operations and a number of arithmetic and complex search operations, according to the invention.

In addition to search operations, the memory under consideration performs the masking operation, a complete set of logical operations as well as all operations that can be represented as a finite set of search and logical operations. This memory comprises an additional mask register 17 (FIG. 5) designed to store the mask code, while the positions of "1"s and "0"s in this code indicate the binary associative indications of the interrogation code irrelevant to the search operation to be performed. The term "mask code" is meant to denote a binary code with digits equal in number to those in the interrogation code with the positions "1" in the mask code show the interrogation indications that are relevant to a given search operation. The register 17 has one or more flip-flops 18 in accordance with the number of binary associative indications in the interrogation code. Besides, the memory is provided with OR circuits 19, the first inputs whereof are connected to the "1" and "0" outputs of respective flip-flops 18, while the second inputs of the circuits 19 are connected to the outputs of respective flip-flops 6. The outputs of the circuits 18 are connected to the inputs of the converter 7.

In addition, the memory comprises multi-input OR circuits 20 and an output register 21 with one or more flip-flops 22 according to the number of binary associative indications in the interrogation code. The flip-flops 22 are arranged in groups 23 with one or more flip-flops in each. The input of each group 23 of flip-flops 22 is connected to the output of a respective circuit 20, the inputs whereof are connected to respective buses 3 in the modules 1. The flip-flops 6 of the register 5 and the flip-flops 8 of the register 17 are also arranged in groups (referred to as groups 8 and groups 24, respectively), the number of flip-flops in these groups being equal to that of flip-flops in the group 23 of the register 21.

The memory also has an input register 25 comprising one or more flip-flops 26 in accordance with the number of binary associative indications in the interrogation code. The flip-flops are arranged in groups 27 with one or more flip-flops in each. Then, the memory is provided wth coincidence circuits 28, the first inputs whereof are connected either to the "1" or "0" outputs of the flip-flops 26 in a respective group 27, and an operation decoder 29, the respective outputs whereof are connected to the second inputs of the circuits 28. Therewith, the outputs of certain circuits 28 are connected to the inputs of respective flip-flops 6, while the outputs of other circuits 28 are connected to the inputs of respective circuits 20.

The groups 23 and 27 comprising the flip-flops 22 and 27, respectively, make up shift registers, while the groups 24 of the flip-flops 18 form ring shift registers.

Figure 6:
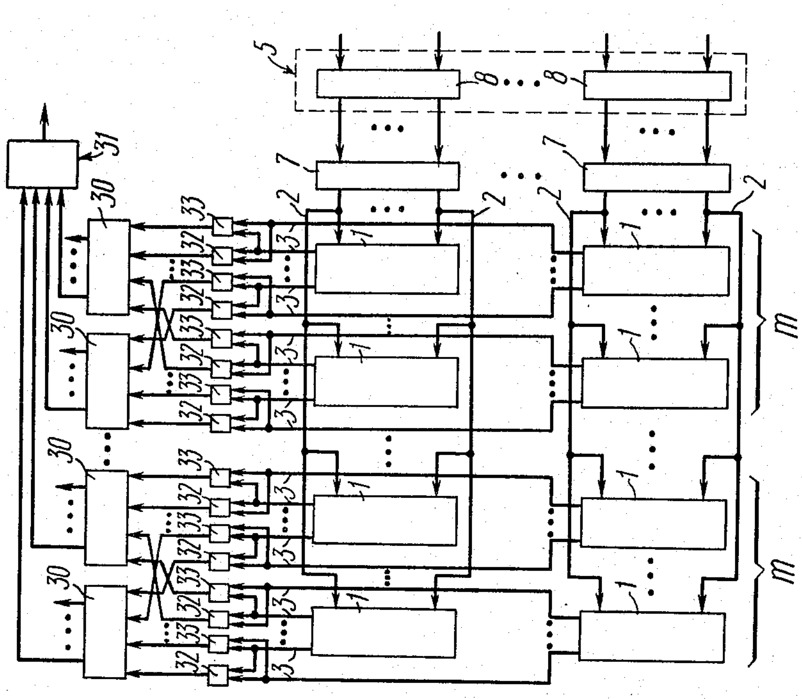
FIG. 6 is a functional diagram of a memory which makes it possible to raise the equipment efficiency, according to the invention.

Besides, the memory is provided with additional decoders 30 (FIG. 6), a priority circuit 31, "0" signal coincidence circuits 32 and "1" signal coincidence circuits 33. The inputs of the circuit 31 are connected to the first outputs of all the decoders 30. The modules 1 are combined into sets of $m$-modules, the similar buses 3 of the modules 1 in each set being connected to the inputs of the circuits 32 and 33 which correspond to this set, and the outputs of the circuits 32 and 33 of each set are connected to the inputs of respective decoders 30.

Figure 7:
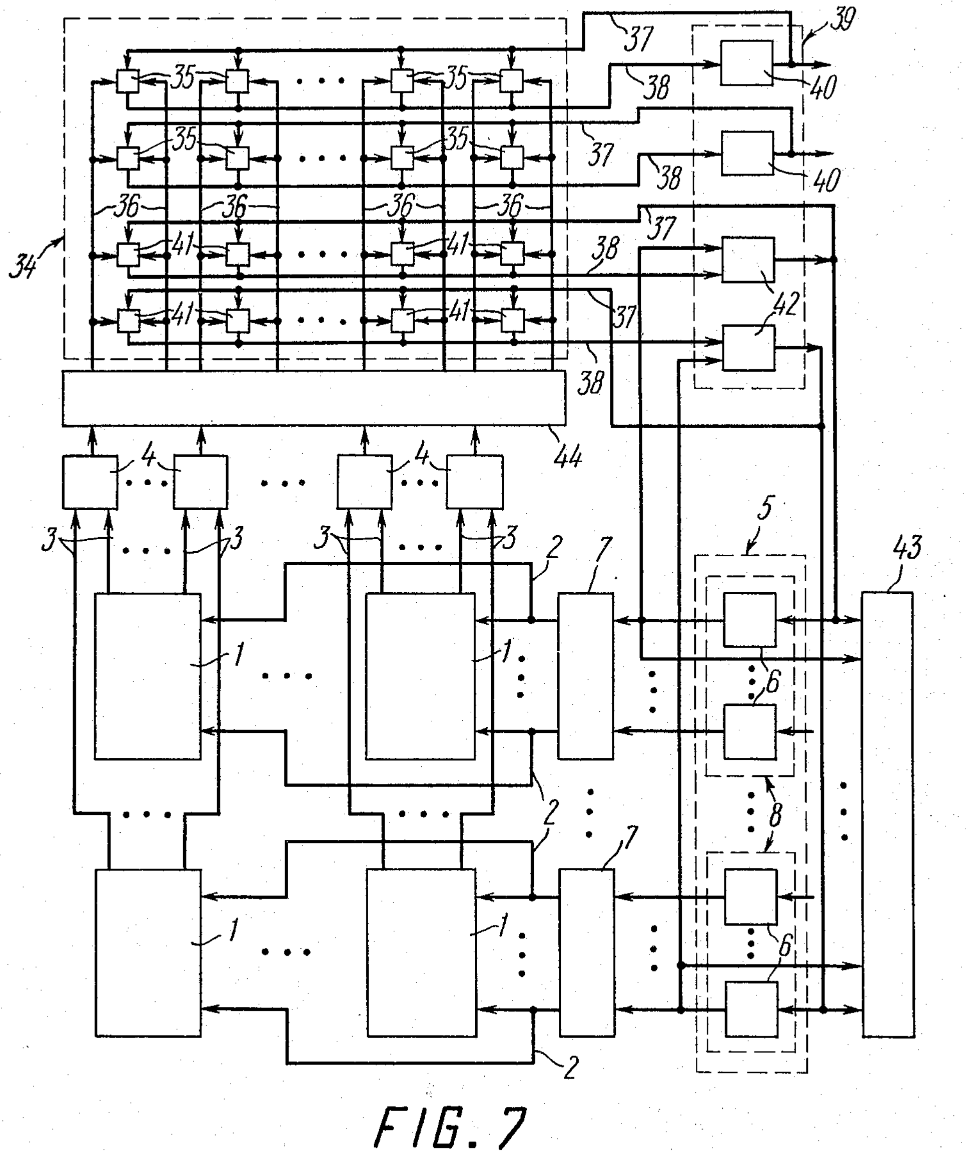
FIG. 7 is a functional diagram of a memory having high response when data is rewritten in occupied associative cells (words), according to the invention.

The memory is further provided with a data storage unit 34 (FIG. 7) comprising memory elements 35 interconnected through address buses 36, digit write buses 37 and digit read buses 38 and arranged in K-bit words. In addition, the memory has a data register 39 comprising a plurality of flip-flops 40 equal in number to the bits in the word stored in the unit 34, the buses 38 of the unit 34 being connected to the inputus of respective flip-flops 40, the buses 37 being connected to the outputs of respective flip-flops 40 and the buses 36 of the unit 34 being coupled electrically to the outputs of respective detectors 4. Each cell in the unit 34 also has additional memory elements 41 and the register 39 is provided with a number of additional flip-flops 42, the elements 41 in each word of the unit 34 and the flip-flops 42 being equal in number to the flip-flops 6 in the register 5. The second inputs of the flip-flops 42 are connected to the outputs of the similar flip-flops 6, while the inputs of the flip-flops 6 in the register 5 are connected to the outputs of the similar flip-flops 42.

The memory additionally comprises a digit-by-digit comparison circuit 43. The first group of inputs of this circuit is connected to the outputs of respective flip-flops 6, while the second group of inputs is connected to the outputs of respective flip-flops 42.

The memory also includes a code converter 44 having its inputs connected to the outputs of all the detectors 4, while the outputs of the converter are connected to respective buses 36 in the unit 34.

The associative memory built according to the invention is intended to perform search and logical operations as attributive information presented in the form of multidigit associative words, i.e., in the form of sets comprising a number of binary associative indications.

The address memory modules 1 serve to store binary data and comprise the memory elements $1^1$ interconnected through the address buses 2 and the digit buses 3 which are intended to record and select the data stored in these modules 1. The detectors 4 are used to detect the location data with a given set of binary associative attributes the inputs of the detectors 4 being coupled electrically to respective digit buses 3 of the address memory modules 1. The interrogation register 5 is intended to store the given set of binary associative indications which represents the interrogation code and is provided with the flip-flops 6 equal in number to the binary associative indications in the interrogation code, the outputs of the flip-flops 6 in the interrogation register 5 being coupled electrically to the address buses 2 of the respective address memory modules 1.

The memory of the present invention comprises the interrogation converters 7 intended to convert the interrogation code from a binary position code into a code with a constant number "1"s. In this case, the flip-flops 6 in the interrogation register 5 are divided into the groups 8, the inputs of each converter 7 being coupled electrically to the outputs of a respective group 8 of the flip-flops 6 in the interrogation register 5 and the outputs of each interrogation converter 7 being connected electrically to the address buses 2 of respective address memory modules 1.

The memory operates as follows. When a new associative word is being written in the memory, the code of this word arrives to the inputs of the flip-flops 6 (FIG. 1) in the register 5. In case the converters 7 are designed as the decoders 9 (FIG. 2), it is precisely one output that is excited in each decoder 9 in accordance with the code that has arrived to the inputs of the group 8 of the flip-flops 6 coupled electrically to said decoder.

Signals from these outputs excite respective buses 2 of the modules 1 (FIG. 1). Simultaneously, the write circuits excite respective digit buses 3 of the modules 1 connected to the detector 4 which corresponds to one of the associative cells (the write circuits are not shown in the diagram). The term "associative cell" here and in what follows is meant to denote an assembly of the memory elements $1^1$ of the modules 1 which are coupled to respective digit buses 3 connected to the inputs of the detector 4. As a result, "1"s (or "0"s) are written in the memory elements $1^1$ located at the intersections of the excited buses 2 and 3. The rest of the memory elements on the buses 3 of the modules 1 have "0"s (or "1"s) written therein earlier. Hence, the process of writing a new associative word in the memory consists in remembering the state of each decoder 9 in a respective module 1 either in the form of a code of "1" against the background of "0"s, the "1"s being recorded at points where the excited address buses 2 cross the digit buses 3, or in the form of a code "0" against the background of "1"s, the "0" s being recorded at points where the excited address buses 2 cross the digit buses 3.

When the modules 1 are interrogation in order to detect the codes of the associative words coinciding with the interrogation code, it is only the address buses 2 that become excited. Just as in the case of writing, the numbers of the excited buses 2 are detected in accordance with the interrogation code in the register 5. The modules 1 are interrogated in parallel since all the memory elements $1^1$ coupled to the excited buses 2 become excited, i.e., one element in each module 1 on the digit bus 3 connected to the input of one of the detectors 4. In case the code that has arrived to the input of a given group 8 of the flip-flops 6 coincides with the code written in the elements $1^1$ connected to the digit bus 3 of one of the modules 1, a "1" ("0") signal is read at the output of respective digit bus 3. In case the interrogation code and the code of a respective associative word do not coincide, the outputs of the respective buses 3 produce a "0" (or "1") signal. If the interrogation code fully coincides with the code of the associative word corresponding to any one of the detectors 4, all the digit buses 3 connected to this detector 4 will produce "1" (or "0") signals, which is recorded by the detector 4 designed as a comparison circuit. The term "full coincidence" here and in what follows is meant to denote that the codes arriving to the inputs of all groups 8 of the flip-flops 6 in the interrogation register 5 coincide with the code of the associative word stored in a given associative cell, i.e., in the assembly of the memory elements $1^1$ of the modules 1 coupled to respective digit buses 3 that are connected to the input of said detector 4.

There are two types of digit buses in the modules 1, viz. the write digit buses and the read digit buses. FIG. 1 shows common digit buses which perform both functions.

The memory designed according to the invention makes an efficient use of the modules 1 employing a small number of address buses. In case the number of address buses is great, i.e., in case the modules 1 have a high capacity, it is more efficient to use interrogation code converters than convert the standard position code into a code with a constant number of "1"s. In the simplest way, this conversion is performed with the use of the long-term memory modules 11 (FIG. 3). The memory in this case operates as it does when its interrogation converters are designed as interrogation decoders, the only difference being that in the general case of using the code with a constant number of "1"s, several outputs of each converter 7 are excited simultaneously.

In case the number of address buses is great, it is more expedient to use the converter 7 (FIG. 4) which converts a digit position code into a code with a constant number of "1"s. The converter comprises the modulo 2 adders 14, while each group 8 of the flip-flops 6 in the interrogation register 5 is divided into sets 15, the first set consisting of subgroups with one flip-flop 6 in each and subsequent sets 15 consisting of subgroups 16 having two or more flip-flops 6. The interrogation decoders and the adders 14 are also divided into sets 15 consisting of subgroups 16, the outputs of the interrogation decoders 9 in each subgroup being connected to the first inputs of the modulo 2 adders that belong to the same subgroup, the output of each adder 14 being connected to the second inputs of the adders 14 in one of the subgroups 16 of a subsequent set 15 and the outputs of the adders 14 in the final set 15 being connected to the address buses of respective address memory modules 1.

The operation of the memory, is illustrated by the performance of the interrogation converter 7 according to formulas relating the input variables $a_j$ of the interrogation converter 7 to the output variables $A_i$ of the same converter 7, where N is the number of digits in an associative cell, i.e., the number of output variables or the number of the address buses 2, $n$ is the number of input variables, i.e., the number of the flip-flops 6 in the interrogation register 5; $1 \leq i \leq N$; $1 \leq j \leq n$ for the cases when $$\left.\begin{array}{l} n = 1;\ N = 2 \\ A_1 = a_1;\ A_2 = a_1 \end{array}\right\} \quad (1)$$

$$\left.\begin{array}{l} n = 5;\ N = 8 \\ A_1 = \overline{a}_1 \oplus \overline{a}_2\overline{a}_3;\ A_2 = \overline{a}_1 \oplus \overline{a}_2 a_3;\ A_3 = \overline{a}_1 \oplus a_2\overline{a}_3;\ A_4 = \\ \quad \overline{a}_1 \oplus a_2 a_3 \\ A_5 = a_1 \oplus \overline{a}_4\overline{a}_5;\ A_6 = a_1 \oplus \overline{a}_4 a_5;\ A_7 = a_1 \oplus a_4\overline{a}_5;\ A_8 = \\ \quad a_1 \oplus a_4 a_5 \end{array}\right\} \quad (2)$$

Output signals $A_1$ through $A_4$ for $N = 8$ are obtained by means of modulo 2 addition of the signal $A_1 = \overline{a}_1$ for $N = 2$ to the signals at the outputs of the decoder the input whereof receives signals $(a_2, a_3)$; output signals $A_5$ through $A_8$ for $N = 5$ are obtained by means of modulo 2 addition of the signal $A_2 = a_1$ for $N = 2$ to the signals at the outputs of the decoder the input whereof receives signals $(a_4, a_5)$.

When the number of outputs is great, e.g. $N = 32$, $A_1 = \overline{a}_1 + \overline{a}_2\overline{a}_3 + \overline{a}_6\overline{a}_7$, etc. Hence, output signals $A_i$ for $N = 32$ will be obtained by means of modulo 2 addition of signals $A_i$ for $N = 8$ to the signals at the output of the decoders the inputs whereof receive signals $(a_6, a_7)$, $(a_8, a_9)$, $(a_{10}, a_{11})$, etc.

The operation of the memory is similar to that of devices in which the interrogation converters 7 are designed as interrogation decoders 9 or as long-term memory modules 11.

According to the invention, the memory is provided with a mask register 17 intended to store the mask binary code wherein the positions of "1"s and "0"s show the interrogation code indications irrelevant to the search operation to be performed. The mask register 17 comprises one or more flip-flops 18, the number of which is equal to that of indications in the interrogation code, as well as OR circuits 19 the first inputs of which are connected either to the "1" or to the "0" outputs of respective flip-flops 18 in the mask register 17 and the second inputs of which are connected to the outputs of respective flip-flops 6 in the interrogation register 5, the outputs of the circuits 19 being connected to the inputs of respective interrogation converters 7.

The operation of the memory when part of the interrogation code indications is masked will now be described for the case when the system uses the code "1" against the background of "0"s.

New associative words are written in a manner similae to that of recording new words in an associative memory with the interrogation converters 7 designed as the interrogation decoders 9.

Interrogation without masking is also carried out in this manner.

When interrogation is performed with masking, the mask code, in which the "1"s correspond, for instance, to the interrogation indications irrelevant to a given search operation, is set in the register 17. From the output of a respective flip-flop 18, the "1" code arrives to the first input of the OR circuits 19, the second inputs whereof are connected to the "1" and "0" outputs of the similar flip-flop 6 in the interrogation register 5. This results in a "1" signal across the outputs of both circuits 19 coupled to said flip-flop 6. In case other flip-flops 18 of said group 24 are in the "0" state, the first inputs of the other circuits in the same group receive "0" signals and, hence, the output of one of the circuits 19 which is coupled to a respective flip-flop 6 is in the "1" state and that of the other circuit 19, in the "0" state with the result that two outputs of a respective decoder 9, whose numbers are determined by that of the masked interrogation indications are excited. When two interrogation indications are masked, four definite outputs of the interrogation decoder are excited; with three masked indications there are eight definite outputs, etc. These outputs of the decoder 9 excite, in turn, respective address buses 2 in the modules 1. It means that the required number of the memory elements $1^1$ are interrogated in accordance with the masked interrogation indications. Thus, if the intersection between any one of the excited buses 2 and a given digit bus 3 of the module 1 bears a "1", the output of a respective detector 4 produces a coincidence signal in the form of, say, a "1". Otherwise, the operation of the memory, when part of the interrogation indications is masked, does not differ from that of a memory whose interrogation converters 7 are designed as the interrogation decoders 9.

According to the invention, the memory is provided with multi-input OR circuits 20 and an output register 21 intended to receive data that is read off from respective address memory modules 1. The register includes several flip-flops 23 the number of which is equal to that of indications in the interrogation code. This output register 21 is divided into groups 23 with one or more flip-flops 22 in each. Connected to the input of each group 23 of flip-flops 22 in the output register 21 is the output of a respective multi-input OR circuit 20, the inputs whereof are coupled to respective digit buses 3 of the address memory modules 1. The flip-flops 6 in the interrogation register 5 and in the mask register 17 are also divided into groups 8 and 24. The number of the flip-flops 6 and 18 in these groups is equal to that of the flip-flops 22 in the groups 23 of the output register 21.

The code written in the memory elements $1^1$, that are connected to a particular digit bus 3 of the module 1, is restored as a standard position code and the number of cycles required for the procedure is equal to that of the flip-flops 6 of a respective group 8 in the interrogation register 5. Therewith, the first digit of the initial position code of each group 8 is obtained by driving the flip-flops 6 of this group to the "1" state and the flip-flops 18 of each group 24, to the "11 . . . 10" state. Excited at the output of a respective decoder 9 are all the buses 2 having odd numbers (addresses), i.e., 1, 3, 5 . . . (the initial address is denoted by a "0"). In other words, if a "1" has been written in any of the odd memory element $1^1$ coupled to a given digit bus 3 of the selected module 1, the output of thi digit bus 3 produces a coincidence signal in the form of a " 1" signal. Now, if the "1" has been written in a memory element $1^1$ having an even number, the output produces a non-coincidence signal in the form of a "0". This signal is applied, via the circuit 20, to the input of a respective group 23 of flip-flops in the output register 21. The second digit of the position code is obtained by means of shifting the code in the register 23 by one step, while the code in the register 8 remains intact and the code in the register 24 is cyclically shifted by one step. The result is that the outputs of the decoder 9 bearing numbers 2, 3, 6, 7, . . l. become excited and this corresponds to a "1" in the second digit of any position code. The coincidence or non-coincidence signal appearing at the output of the selected digit bus 3 of the module 1 is applied, via the circuit 20, to the input of the register 23, etc.

The required associative word is selected by means of gating respective digit buses 3 with the help of the write circuits, i.e., one or several buses 3 coupled to the inputs of the given detector 4.

The memory described above performs all logical operations on two variables (operands) one of which is stored in the modules 1 as an associative word encoded as a "1" against the background of "0"s, while the other is in the input register 25 in the form of a standard position code.

The input register 25 is intended to store a multidigit binary code. This code as well as the code of any one of the associative words stored in the address memory modules 1 can be subjected to any required logical operation. The input register 25 includes flip-flops 26 the number of which is equal to that of indications in the interrogation code. The register 25 is divided into groups 27 of flip-flops 26. In addition, the device is provided with coincidence circuits 28, the first inputs whereof are connected either to the "1" or to the "0" outputs of the flip-flops 26 of a respective group 27 in the register 25. An operation decoder 29 is intended to control the data transfer to the interrogation register 5 and to the output 2 since respective data is transferred from the outputs of the flip-flops 26 in the input register 25 in the direct or reverse code depending on the logical operation to be performed and on the code stored in the input register 25. In this case, the respective outputs of the operation decoder 29 are connected to the second inputs of the coincidence circuits 28, the outputs of part of the coincidence circuits 28 are connected to the inputs of respective flip-flops 6 in the interrogation register 5 and the outputs of the rest of the coincidence circuits 28 are connected to the inputs of respective multi-input OR circuits 20. At the same time, the groups 27 and 23 of the flip-flops 26 and 22 in the input and output registers 25 and 21, respectively, make up shift registers, while the groups of the flip-flops 18 in the mask register 17 make up ring shift registers.

Logical operations performed on two operands may be divided into three groups:

a. inversion, direct code access, modelo 2 addition and equivalence operation;

b. operations of logical addition of four combinations of two operands in the direct and reverse codes;

c. operations of logical multiplication of the same four combinations.

Consider now an operations under (*a*), namely modulo 2 addition. If a "0" is written in a low-order digit flip-flop 26 of the group 27 (i.e., in the low-order digit of one of the first operand groups), then the respective digit of the second operand should be selected in the direct code. But if it is a "1" that is written in the low-order digit of the first operand, then the access will be performed in the reverse code (the selected digit of the second operand is inverted). The sequence of operations in this case is the same as during the access in the direct code, the only difference being that the inputs of the flip-flops 6 in the interrogation register 5 receive a "0" code arriving from the "0" output of the low-order digit flip-flop 26 in the group 27 via respective coincidence circuits 28; The result is that the outputs of the decoder 9 which correspond to "0"s in the given digit of the position code become excited. The same operation is performed on the rest of the digits of both operands in a similar manner. The function of controlling the coincidence circuits 28 is performed by a decoder 29. The operation of inverting the code of the given associative word is similar to that of modelo 2 addition to the code of the first operand 11 . . . 1, while in case of a direct code access the first operand is equal to 00 . . . 0. The equivalence operation is similar to that of the modelo 2 addition of the code of a given associative word to the code of the first operand.

The operation of logical addition is performed as follows. If the given digit of the first operand contains a "0", it will be accessed either in the direct or reverse code depending on whether the first operand participates in the operation in the direct or reverse code. If it is a a "1" that is contained in this digit of the first operand, then this or the reverse code is transferred to the register 21 via corresponding circuits 28 and 20.

The operations involving logical multiplication require that the modules 1 should be addressed when a "1" code is present in the digit of the first operand. In case the same digit of the first operand contains a "0" code, the operation consists in a direct transfer of data from the register 25 to the register 21. The result of the operation is transferred within one cycle from the register 21 to the register 25 (the data transfer circuit between the register 21 and the register 25 is not shown in the drawing).

According to the invention, the device under consideration is provided with additional decoders 30 each performing, the function of a number of detectors 4, a priority circuit 31 which is intended to select the detectors 4 in the required sequence, the detectors corresponding to a given set of binary associative indications in case of a multidigit access, i.e., a number of associative words are selected simultaneously. The inputs of the priority circuit 31 are connected to the first outputs of all the additional deciders 30. In addition, the device is provided with "0" and "1" signal coincidence circuits 33. The address memory modules 1 make up sets of $m$-modules used to store $m$-digit binary associative indications, which makes it possible to store up to $2^m - 1$ different associative indications and, hence, up to $2^m - 1$ different associative words in a set of $m$-address memory modules using $m$ digit buses. Here, the similar digit buses of the address memory modules 1 in each set are connected to the inputs of the "0" and "1" signal coincidence circuits 33 corresponding to this set, while the outputs of the coincidence circuits 33 in each set are connected to the inputs of respective additional decoders 30.

The efficiency of the equipment used in the modules 1 can be improved by means of modifying the code "1" against the background of "0"s. In order to write a number of different associative words on one digit bus instead of a unidigit indication "0" or "1", it is feasible that an $m$-digit indication 00 . . . 01, 00 . . . 10, 00 . . . 11, etc. should be introduced, which will allow to write up to $2^m - 1$ different associative words in the memory element $1^1$ connected to a group of $m$-digit buses 3, the indication 00 . . . 00 serving to indicate a vacant address bus 3. The modules 1 are divided into groups of $m$ modules each, which makes it possible to write $m$-digit indications on the similar digit buses 3 of the modules 1 belonging to one set. The function of indicating that the indications recorded in the modules of the given set, connected to different groups 8 of flip-flops in the interrogation register 5, coincide is performed by the "0" signal coincidence circuits 32 and "1" signal coincidence circuits 33. The device operates as follows. When the modules 1 are interrogated, the code arriving to the register 5 excites one bus 2 at the output of each converter 7. If similar $m$-digit indications are written at the intersections of the excited buses 2 and one of the sets of definite buses 3, their coincidence is registered by the circuits 32 and 33 of the given set. In this case, precisely one half of the circuits 32 and 33 of this set are in the "1" state while the other half, in the "0" state. This results in the excitation of one of the outputs of the decoder 30 which is connected to the circuits 32 and 33 of the given set. The number of this decoder 30 is determined by the numbers of the excited circuits 32 and 33 at its inputs. The decoder 30 performs the function of a detector for a number of associative words represented by various $m$-digit indications at its inputs.

In case the modules 1 are being interrogated when the indications on the excited buses 2 belonging to various groups 8 do not coincide, in the respective sets there are excited less than half of the circuits 32 and 33, while the decoders 30 have no excited outputs at all.

The first outputs of respective decoders 30 are excited in case vacant associative cells are interrogated (i.e., the positions on digit buses bearing the indications 00 . . . 0).

Prior to writing a new associative word, a particular $m$-digit indication should be allotted to it. To do this, it is necessary to interrogate the code that is to be recorded in the memory device. Then, vacant modules 1 should be registered, the indication of their "vacancy" meaning that the first output of the respective decoder 30 has been excited. The circuits 31 is used to select one of the vacant decoders 30 and the code of a respective unused $m$-digit indication. This indication is recorded in the memory elements $1^1$ connected to the corresponding buses 2 and 3. In this case the device is occupied completely, one of the associative words is erased beforehand, and the circuit 31 stores the $m$-digit indication that corresponds to it. After that, a new associative word is recorded with the indication that has been vacated.

According to the invention, the memory is provided with a data storage unit 34 comprising memory elements 35 interconnected through address buses 36, digit write buses 37 and digit read buses 38. The elements make up cells of K digits. The unit is intended to store data every word of which is determined by a given set of binary associative indications recorded in the address memory modules 1 that form the memory unit for storing data indications. In addition, the device is provided with a data register 39 comprising flip-flops 40 the number of which is equal to that of digits in a cell of the data storage unit 34. The read digit buses 38 of the data storage unit 34 are connected to the inputs of respective flip-flops 40 in the data register 39, the write digit buses 37 of the unit 34 are connected to the outputs of respective flip-flops 4 in the data register 39, while the address buses 36 of the unit 34 are coupled electrically to the outputs of respective detectors 4. Each cell of the data storage unit 34 is provided with additional memory elements 41 used to write the code of an associative word that is placed in accordance with the given cell of the data storage unit 34. The data register 39 is provided with additional flip-flops 42 serving either to store the codes that arrive from the interrogation register 5 to be written in the data storage unit 34 or to receive codes from the data storage unit 34. The number of additional memory elements 41 in each cell of the data storage unit and the number of additional flip-flops 42 in the data register 39 are equal to that of the flip-flops 6 in the interrogation register 5. The second inputs of the additional flip-flops 42 in the data register 39 are connected to the outputs of the similar flip-flops 6 in the interrogation register 5 while the inputs of the flip-flops 6 in the interrogation register 5 are connected to the outputs of the similar additional flip-flops 42 in the data register 39. Every word in the data storage unit 34 bears the position code of an associative word, the code being stored in a respective word of the indication device, comprising modules 1, in the form of the code "1" against the background of "0"s.

In case rewriting is to be made in the selected associative cell (an associative word), a respective detector 4 is excited first. This results in the excitation of respective buses 36 and in the selection of a word from the unit 34, the number of the word being determined by the number of this detector 4. The code of a given associative word that has been stored in the memory elements 41 arrives, via the buses 38, to the register 39 and then, from the outputs of the flip-flops 42 of this register 39, to the inputs of the flip-flops 6 in the register 5. In accordance with this code, the buses 2 at the output of the converters 7 are excited and a "0" code is written in the elements 1[1] coupled to the selected buses 2 and 3, i.e., the former ("old") associative word is erased in respective modules 1. Then, a new associative word is written in the indication section of the device (the modules 1). The code of the word is transferred from the register 5 to the inputs of the flip-flops 42 in the register 39 to be written in the memory elements 4 interconnected through the selected buses 36 and 37. When a new word is being written in a vacant cell, the indication of a vacancy is the presence of a "0" code in the additional elements 41 of this cell.

According to the invention, the memory is provided with a digit-by-digit comparison circuit 43, the first inputs whereof are connected to the outputs of respective flip-flops 6 in the interrogation register 5, while the second inputs are connected to the outputs of respective additional flip-flops 42 of the data register 39.

In the course of interrogation, an additional performance-validity check of the device is carried out since the code of the associative word written in respective elements 41 of the unit 34 is compared with the interrogation code, by using the circuit 43.

According to the invention, the memory is also provided with a code converter 44 which is intended to match the number of the excited detector 4 with those of the address buses 36 in the data storage unit 34. The inputs of the code converter 44 are connected to the outputs of all the detectors 4, while the outputs of the code converter 44 are connected to respective address buses 36 of the data storage unit 34.

If the data storage unit 34 operates as a unit providing access on the basis of the address signal coincidence, the converter 44 is used to convert the number of the excited detector 4 into the numbers of respective buses 36.

The associative memory described above makes it possible to reduce several times the cost of the associative search with respect to that performed with the help of memories using special associative elements, which is due to the employment of cheaper address accessible memory modules. At the same time as regards its possibilities, the memory is substantially universal, i.e., it allows for performing search and logical operations, as well as a finite sequence of search and logical operations. This associative search method permits of increasing several times the capacity of an associative memory when compared to known memory devices.

What is claimed is:

1. An associative memory for performing search and logical operations on attributive information presented as multi-digit binary associative words or sets of a plurality of binary associative indications comprising: address memory modules arranged in a matrix for storing binary data; address and digit buses of said address memory modules for recording and selecting the data stored in said address memory modules; memory elements in said address memory modules interconnected to said address and digit buses; detectors for detecting the location of data with given sets of binary associative indications, the inputs of said detectors being coupled electrically to said respective digit buses of said address memory modules; an interrogation register for storing a given set of binary associative indications which is the interrogation code, and having flip-flops with inputs and outputs, the number of said flip-flops being equal to that of binary associative indications in the interrogation code, the outputs of said flip-flops in said interrogation register being coupled electrically to said address buses of said respective address memory modules; said detectors being coincidence circuits having a numbers of inputs equal to that of said groups of said flip-flops in the interrogation register, and outputs of said detectors being electrically coupled to said inputs of said interrogation register; interrogation converters for converting the interrogation code from a binary position code into a code with a constant number of "1"s, the interrogation converters being provided with inputs and outputs, said inputs of each interrogation converter being coupled electrically to said outputs of a predetermined group of said flip-flops in said interrogation register and said outputs of each interrogation converter being connected electrically to said address buses of individual ones of said address memory modules, said interrogation converters being interrogation decoders converting a binary position code into a single excited-state code.

2. A memory as claimed in claim 1, which comprises a code converter provided with inputs and outputs and intended to establish whether the number of said excited detector corresponds to the numbers of said address buses of said data storage unit; said inputs of said code converter are connected to said outputs of all said detectors; said outputs of said code are connected to said respective address buses of said data storage unit.

3. A memory as claimed in claim 1, wherein said interrogation converters are provided with long-term memory modules intended to convert the interrogation code from a binary position code into a code with a constant number of "1"s, said long-term memory modules being provided with address and digit to select the codes recorded in said long-term memory modules; said address buses of each one said longterm memory module being connected to said outputs of said respective interrogation decoder, and said digit buses of each said long-term memory module being connected to said address buses of said respective address memory modules.

4. A memory as claimed in claim 1, wherein said interrogation converters are provided with long-term memory modules intended to convert the interrogation code from a binary position code into a code with a constant number of "1"s; said long-term memory modules having address and digit buses to select the codes recorded in said long-term memory modules; said address buses in each said long-term memory module being connected to said outputs of said respective interrogation decoder; and said digit buses of each said long-term memory module being connected to said address buses of said respective address memory modules.

5. A memory as claimed in claim 1, wherein said interrogation converters comprise modulo 2 adders provided with inputs and outputs; each said group of said flip-flops in said interrogation register is divided into sets (consisting of subgroups; said first set comprises subgroups with a single flip-flop; said other sections comprise said subgroups with a plurality of flip-flops; said interrogation decoders and said modulo 2 adders are divided into sets; said sets consist of subgroups; said outputs of said interrogation decoder in each said subgroup are connected to said first inputs of said modulo 2 adders belonging to said subgroup; said output of each said modulo 2 adder is coupled to said second inputs of said modulo 2 adders of one of said subgroups in said next set; said outputs of said modulo 2 adders of said last set are connected to said address buses of said respective address memory modules.

6. A memory as claimed in claim 1, wherein said interrogation converters comprise modulo 2 adders having inputs and outputs; each said group of said flip-flops in said interrogation register is divided into sets consisting of subgroups; said first set comprises said subgroups with a single flip-flop; other said sections contain said subgroups with a plurality flip-flops; said interrogation decoders and said modulo 2 adders are divided into sets; said sets contain subgroups; said outputs of said interrogation decoders in each said subgroup are connected to said first inputs of said modulo 2 adders belonging to said subgroup; said output of each said modulo 2 adders is coupled to said second inputs of said modulo 2 adders in one of said subgroup of said next set; said outputs of said modulo 2 adders in said last section are connected to said address buses of respective said address memory modules.

7. A memory as claimed in claim 1, which is provided with a mask register intended to store the mask binary code wherein the positions of "1"s and "0"s shows the associative indications of the interrogation code irrelevant to the search operation that is being performed; said mask register comprises flip-flops equal in number to the binary associative indications in the interrogation code; said flip-flops are provided with inputs and outputs; OR circuits with inputs and outputs; said first inputs of said OR circuits are connected to said outputs of said respective flip-flops of said mask register; said second inputs of said OR circuits are connected to said outputs of said respective flip-flops in said interrogation register; said outputs of said OR circuits are connected to said inputs of said respective interrogation converters.

8. A memory as claimed in claim 1, which comprises multi-input OR circuits with inputs and outputs; and output register which is intended to receive data derived from said respective address memory modules; said output register includes flip-flops equal in number to the binary associative indications in the interrogation code; said output register is divided into groups of said flip-flops having inputs and outputs; connected to said input of each said group of flip-flops in said output register is said output of said respective multi-input OR circuit; said inputs of said multi-input OR circuit are connected to said respective digit buses of said address memory modules; said flip-flops in said interrogation register and said flip-flops in said mask register are also divided into groups; the number of said flip-flops in said groups of said interrogation register and said mask register is equal to the number of said flip-flops in said groups of said output register.

9. A memory as claimed in claim 7, which comprises multi-input OR circuits with inputs and outputs; an output register which is intended to receive data derived from said respective address modules; said output register includes flip-flops equal in number to the indications in the interrogation code; said output register is divided into groups of said flip-flops with inputs and outputs; connected to each said group of flip-flops in said output register is said output of said respective multi-input OR circuit; said inputs of said multi-input OR circuit are connected to said respective digit buses in said address memory modules; said flip-flops in said interrogation register and said flip-flops in said mask register are also divided into groups; the number of said flip-flops of said interrogation register and of said groups mask register is equal to that of said flip-flops in said groups of said output register.

10. A memory as claimed in claim 1, which is provided with an input register intended to store a multi-digit binary code; any required logical operation can be performed on said multi-digit binary code and simultaneously on the code of any of said associative words stored in said address memory modules; said input register comprises flip-flops having inputs and outputs; the number of said flip-flops is equal to that of indications in said interrogation code; said input register is divided into groups of said flip-flops; the memory also contains coincidence circuits divided into two sets and provided with inputs and outputs; said first inputs of said coincidence circuits are connected to said outputs of said flip-flops of said respective group in said input register; and operation decoder intended to control the transfer of data to said interrogation register and said output register since respective data is transferred from said outputs of said flip-flops in said input register in the direct or reverse code depending upon the logical operation to be performed and upon the code stored in said input register; inputs and outputs of said operation decoder; said respective outputs of said operation decoder are connected to said second inputs of said coincidence circuits; said outputs of one of said sets of said coincidence circuits are connected to said inputs of said respective flip-flops in said interrogation register; said outputs of said other set of said coincidence circuits are connected to said inputs of said respective multi-input OR circuits.

11. A memory as claimed in claim 7 which comprises multi-input OR circuits; inputs and outputs of said multi-input OR circuits; an output register that serves to receive data obtained from respective address memory modules; flip-flops of said output register, equal in number to the indications in the interrogation code; groups of said flip-flops of said output register; inputs and outputs of said groups connected to said input of each said group of flip-flops in said output register is said output of said respective multi-input OR circuit; said inputs of said multi-input OR circuit are connected to said respective digit buses of said address memory modules; groups of said flip-flops in said interrogation register and groups of said flip-flops in said mask register; the number of said flip-flops in said groups of said interrogation register and said mask register is equal to that of said flip-flops in said groups of said output register; an input register intended to store a multi-digit binary code; said multi-digit binary code and, at the same time the code of any other said associative word stored in said address memory modules can be subjected to any required logical operation; flip-flops of said input register; inputs and outputs of said flip-flops; the number of said flip-flops is equal to that of indications in said interrogation code; said groups of said flip-flops in the input register; coincidence circuits; two sets of said coincidence circuits; inputs and outputs of said coincidence circuits; said first inputs of said coincidence circuits are connected to said outputs of said flip-flops in said respective group of said input register; said memory additionally comprises an operation decoder provided with inputs and outputs and intended to control the transfer of data to said interrogation register and said output register since respective data is transferred from said outputs of said flip-flops in said inputs register in the direct or reverse code depending upon the logical operation to be performed and upon the code stored in said input register; said respective outputs of said operation decoder are connected to, said second inputs of said coincidence circuits; said outputs of one of said sections of said coincidence circuits are connected to said inputs of said respective flip-flops in said interrogation register; said outputs of said other section of said coincidence circuits are connected to said inputs of said respective multi-input OR circuits.

12. A memory as claimed in claim 1, wherein said group of flip-flops in said input and output registers are combined to form shift registers while said groups of flip-flops in said mask register are combined to form ring shift registers.

13. A memory as claimed in claim 7, wherein said respective groups of flip-flops in said input and output registers are combined to form shift registers, while said groups of flip-flops in said mask register are combined to form ring shift registers.

14. A memory as claimed in claim 8, which is provided with an input register intended to store a multi-digit binary code; said multi-digit binary code and, at the same time, any of said associative words stored in said address memory modules can be subjected to any required logical operation; said input register comprises flip-flops having inputs and outputs; the number of said flip-flops is equal to that of indications in said interrogation code; said input register is divided into groups of said flip-flops; the memory also contains coincidence circuits divided into two sets and provided with inputs and outputs; said first inputs of said coincidence circuits are connected to said outputs of said flip-flops of said respective group in said input register; in addition the memory comprises an operation decoder provided with inputs and outputs and intended to control the transfer of data to said interrogation register and said output register since respective data is transferred from said outputs of said flip-flops in said input register in the direct or reverse code depending upon the logical operation to be performed and upon the code stored in said input register; said respective outputs of said operation decoder are connected to said second inputs of said coincidence circuits; said outputs of said one set of said coincidence circuits are connected to said inputs of said respective flip-flops in said interrogation register, said outputs of said second set of said coincidence circuits are connected to said inputs of respective said multi-input OR circuits; said groups of flip-flops in said input and output registers are combined to form shift registers; said groups of flip-flops in said mask register are combined to form ring shift registers.

15. A memory as claimed in claim 1, which comprises additional decoders having inputs and outputs; each of said additional decoders performs the function of a number of detectors; the memory also comprises a priority circuit having inputs and outputs which is intended to select the detectors in the required sequence, the detectors corresponding to said required set of binary associative indications in the course of a multidigit access procedure, i.e., when several said associative words are being selected simultaneously; said inputs of said priority circuit are connected to said first outputs of all said additional decoders; in addition the memory contains also "0" signal and "1" signal coincidence circuits having inputs and outputs; said address memory modules are combined to form sets of m address memory modules used to store *m*-digit binary associative indications, which allows a set of "*m*" address memory modules to record up to $2^m - 1$ different associative indications on "*m*" digit buses, and, hence, up to $2^m - 1$ different said associative words; similar said digit buses of said address memory modules of each set are connected to said inputs of said "0" signal and "1" signal coincidence circuits which correspond to a given set; said outputs of said coincidence circuits in each set are connected to said inputs of said respective additional decoders.

16. A memory as claimed in claim 1, which is provided with a data storage unit intended to store data every word of which corresponds to a given set of said binary associative indications stored in said address memory modules that form the storage unit to store data indications; said data storage unit contains memory elements; said memory elements are interconnected through address buses, write digit buses and read digit buses and combined to form K-digit cells; in addition, the memory comprises a data register containing flip-flops with inputs and outputs; the number of said flip-flops is equal to that of digits in a cell of said data storage unit; said read digit buses of said data storage unit are connected to said inputs of respective said flip-flops in said data register, said write digit buses of said data storage unit are connected to said outputs of said respective flip-flops in said data register; said address buses of said data storage unit are coupled electrically to said outputs of said respective detectors; each said cell of said data storage unit is provided with additional memory elements used to record the code of a given associative word that is positioned in accordance with a given said cell in said data storage unit; said data register is provided with additional flip-flops intended to store the code arriving from said interrogation register to be recorded in said data storage unit; said additional flip-flops in said data register also serve to receive codes from said data storage unit, the number of said additional memory elements in each said cell of said data storage unit and the number of said additional flip-flops in said data register are equal to that of said flip-flops in said interrogation register; said second inputs of said additional flip-flops in said data register are connected to said outputs of similar flip-flops in said interrogation register; said inputs of said flip-flops in said interrogation register are connected to said outputs of said similar additional flip-flops in said data register.

17. A memory as claimed in claim 1, which comprises a digit-by-digit comparison circuit having inputs and outputs; said first inputs of said digit-by-digit comparison circuits are connected to said outputs of said respective flip-flops in said interrogation register; said second inputs of said digit-by-digit comparison circuit are connected to said outputs of said respective additional flip-flops in said data register.

18. A memory as claimed in claim 16, which comprises a digit-by-digit comparison circuit having inputs and outputs; said first inputs of said digit-by-digit comparisonx circuit are connected to said outputs of said respective flip-flops in said interrogation register; said second inputs of said digit-by-digit comparison circuit are connected to said outputs of said respective additional flip-flops in said data register.

19. A memory as claimed in claim 6, which comprises a digit-by-digit comparison circuit having inputs and outputs; said first inputs of said digit-by-digit comparison circuit are connected to said outputs of said respective flip-flops in said interrogation register; said second inputs of said digit-by-digit comparison circuit are connected to said outputs of said respective additional flip-flops in said data register; in addition, the memory comprises a code converter provided with inputs and outputs and intended to establish whether the number of excited said detector corresponds to the numbers of said address buses of said data storage unit; said inputs of said code converter are connected to said outputs of all said detectors; said outputs of said code converter are connected to said respective address buses of said data storage unit.

* * * * *